Jan. 10, 1967 M. STAUNT 3,296,698
FOOT CONTROLLER AND CONTROL SYSTEM FOR AIR DRIVEN
AND ELECTRIC MOTOR DRIVEN DENTAL HANDPIECES
Filed Jan. 28, 1963 4 Sheets-Sheet 1
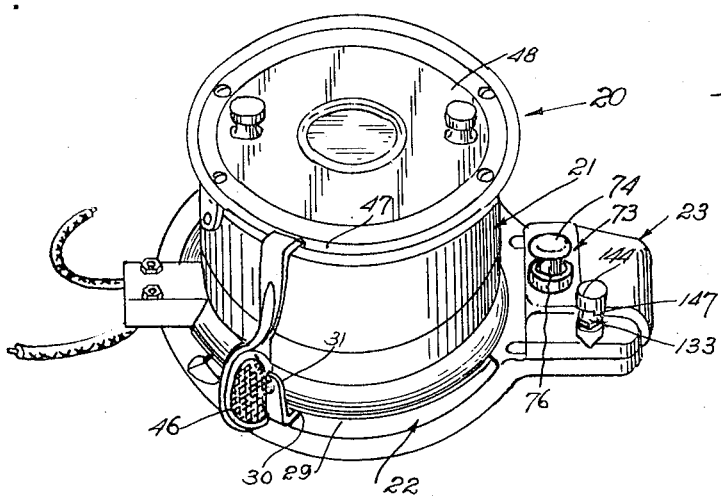
Fig. 1.
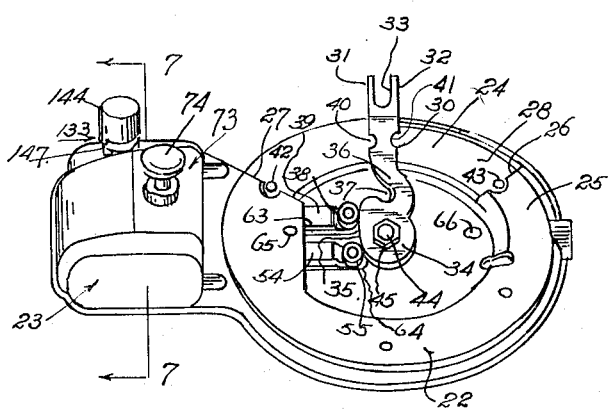
Fig. 2.
Fig. 3.
INVENTOR.
Martin Staunt
BY Robert H. Wena
Attorney.

Jan. 10, 1967　　　　M. STAUNT　　　　3,296,698
FOOT CONTROLLER AND CONTROL SYSTEM FOR AIR DRIVEN
AND ELECTRIC MOTOR DRIVEN DENTAL HANDPIECES
Filed Jan. 28, 1963　　　　　　　　　　　　4 Sheets-Sheet 2

INVENTOR.
Martin Staunt
BY Robert H. Wendt
Attorney.

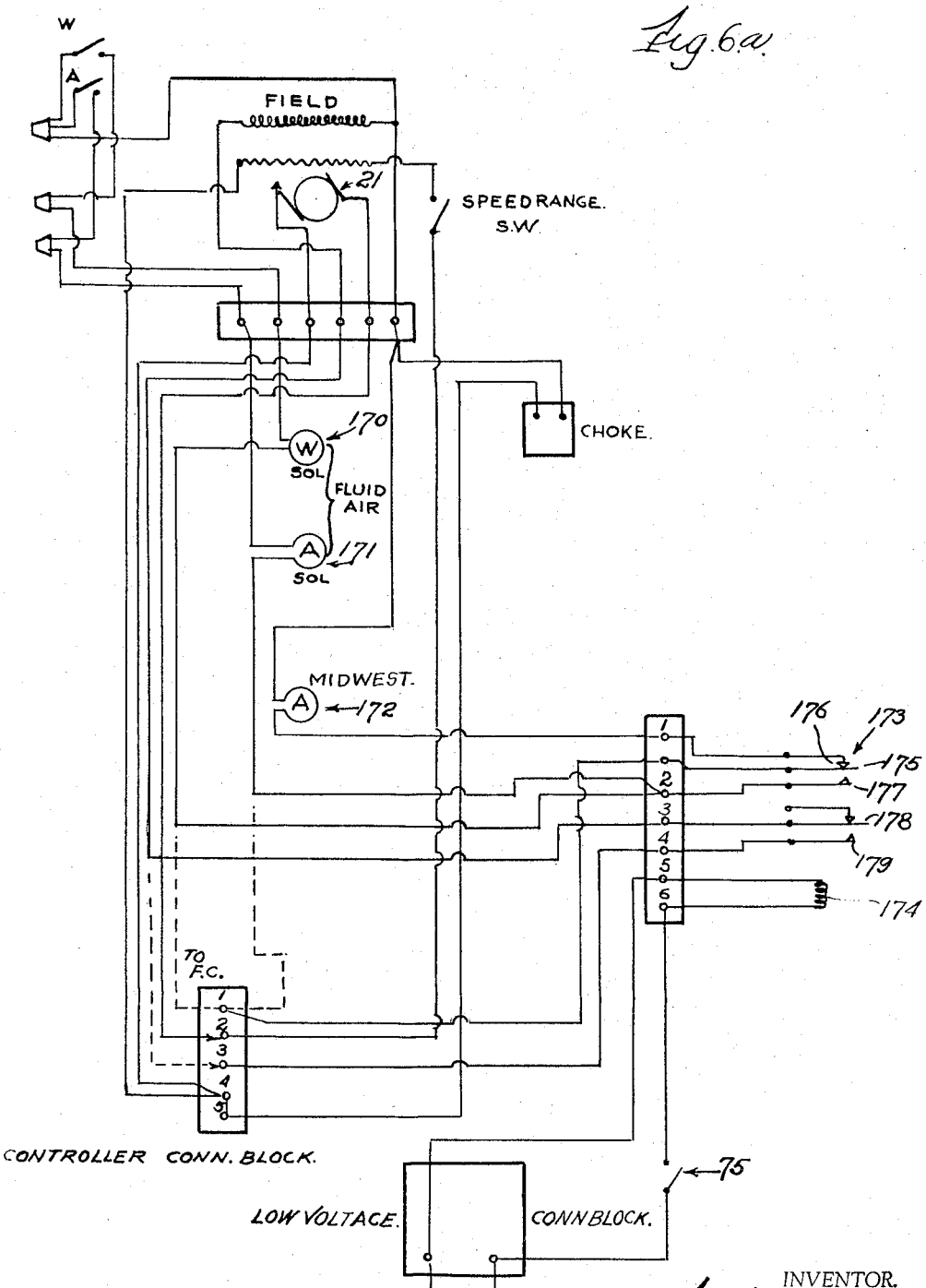

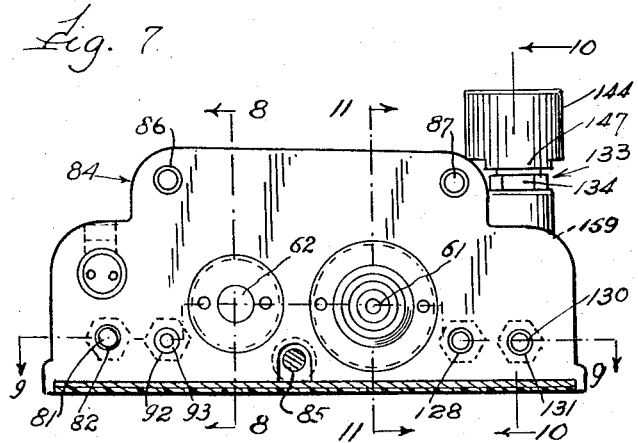
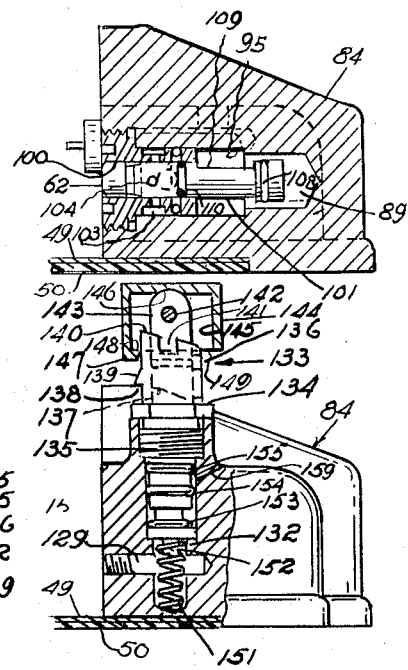
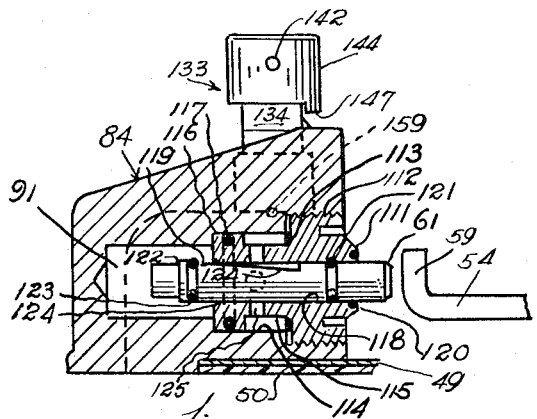

United States Patent Office 3,296,698
Patented Jan. 10, 1967

3,296,698
FOOT CONTROLLER AND CONTROL SYSTEM FOR AIR DRIVEN AND ELECTRIC MOTOR DRIVEN DENTAL HANDPIECES
Martin Staunt, Des Plaines, Ill., assignor, by mesne assignments, to American Hospital Supply Corporation, Evanston, Ill., a corporation of Illinois
Filed Jan. 28, 1963, Ser. No. 254,400
7 Claims. (Cl. 32—28)

The present invention relates to foot controller and control system for air driven and electric motor driven dental handpieces, and is particularly concerned with a single foot controller assembly for controlling the operation of both of these types of dental handpieces.

One of the objects of the invention is the provision of an improved foot controller assembly which permits the operation of the foot controller while the dentist keeps his foot flat upon the floor and moves a single pedal by means of a sideward motion or of a swivel motion of his foot and controlling either an electric motor driven engine or an air driven dental handpiece.

Another object of the invention is the provision of a foot controller assembly and a controlling system which permits the operator to move a foot lever in one direction to start and stop and regulate the speed of an air driven dental handpiece, to move the foot in the other direction, with the handpiece turned off, but the chip cleaning air turned on, so that with a single controlling device the dentist may turn off the handpiece, and while it is still in the patient's mouth he may turn on the chip air and clean the cavity, and resume grinding by moving the foot again to the driving position.

Another object of the invention is the provision of an improved controlling assembly which is to be employed with an existing electric engine foot controller to the bottom of which it is attached in such manner that the electric controller pedal operates the drive air and the chip air valves for controlling an air driven dental handpiece.

Another object is the reduction of the number of controlling devices which the dentist is required to find and operate, and which divert his attention from his work; and it is a prime object of the present invention to control the drive and speed of air driven and electric motor driven dental handpieces by means of a single lever which also controls the use of chip cleaning air.

Another object of the invention is the provision of an improved foot control assembly which is simple in construction, which has a minimum number of parts, which performs its functions efficiently, and which may be manufactured at a low cost.

Other objects and advantages of the invention will be apparent from the following description and the accompanying drawings, in which similar characters of reference indicate similar parts throughout the several views.

Referring to the drawings, of which there are four sheets,

FIG. 1 is a view in perspective of a new foot controller embodying the invention; and used for controlling both electric motor driven and air driven dental handpieces;

FIG. 2 is a view in perspective of the base plate and air valve assembly from which the electric controller of FIG. 1 has been removed;

FIG. 3 is a larger fragmentary view of the electric foot controller lever and the cooperating air control lever on the device of FIG. 4;

FIG. 6a is a wiring diagram showing the circuits employed with the present foot controller.

FIG. 7 is a fragmentary sectional view taken on the plane of the line 7—7 of FIG. 2, looking in the direction of the arrows;

FIG. 8 is a fragmentary sectional view taken on the plane of the line 8—8 of FIG. 7, looking in the direction of the arrows;

FIG. 9 is a fragmenary sectional view taken on the plane of the line 9—9 of FIG. 7, looking in the direction of the arrows;

FIG. 10 is a fragmentary sectional view taken on the plane of the line 10—10 of FIG. 7, looking in the direction of the arrows;

FIG. 11 is a fragmentary sectional view, taken on the plane of the line 11—11 of FIG. 7, looking in the direction of the arrows;

FIG. 12 is an exploded view of the parts of the latching air valve assembly in partial section on the plane of the line 10—10 of FIG. 7.

Figure 4:
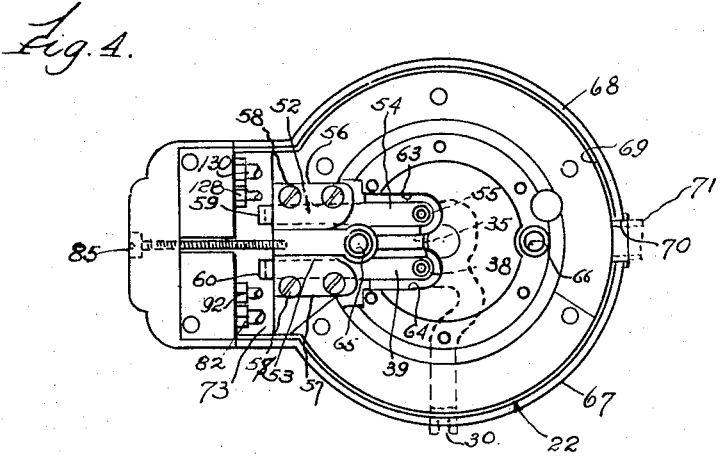
FIG. 4 is a bottom plan view of the base plate of FIG. 2 with the cover plate removed.
Figure 5:
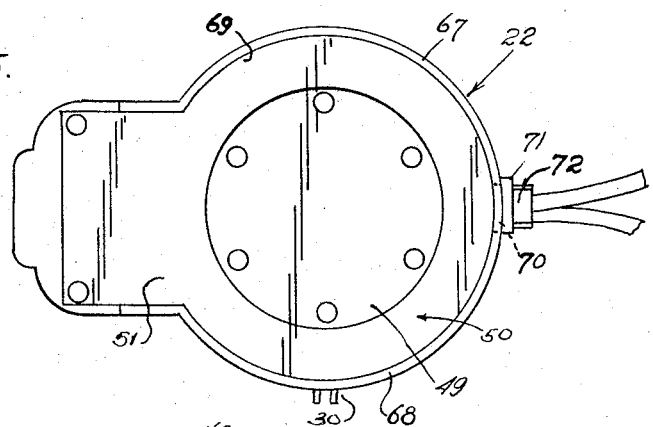
FIG. 5 is a bottom plan view similar to FIG. 4 with the cover plate and rubber pad on the bottom of base plate shown in FIG. 2.

Referring to FIGS. 1–3, 20 indicates in its entirety the assembly of the present controller for air driven dental handpieces with an electric controller of the type used for controlling an electric dental engine.

The electric controller is indicated by the numeral 21; and it is secured by means of a plurality of screw bolts upon a metal base 22, comprising a cast metal plate which carries the foot controller 23 for an air driven dental handpiece. The cast metal plate 22 is shown without the electric controller in FIG. 2; and it comprises a unitary die casting with a circular body 24 having an upwardly projecting annular supporting surface 25 for engaging the bottom of the electric controller; but the annular surface 25 is interrupted by an arcuate portion from the line 26 to the line 27, forming a lower surface 28 which provides a slot 29 for passing the cam lever 30, which projects radially from the slot and is provided with a pair of upwardly projecting tines 31, 32 separated by the slot 33 at the outer end of the cam lever 30.

The cam lever 30 comprises a flat metal bar having a central enlargement 34 which is formed on one side with a cam 35; and the lever 30 is offset upwardly at 36 and has a curved lateral groove 37 which provides a clearance with respect to one of the rollers 38 on a plunger 39, thus permitting a greater range of movement of the lever.

The lateral grooves 40 and 41 in the lever are also for providing a clearance with respect to the securing bolts 42, 43 which fasten the plate to the electric controller 21.

The enlargement 34 on the lever has a circular bore for passing a screw bolt 44, which passes through the plate 22 and is provided with a nut 45 for pivotally mounting the lever on the plate.

The purpose of the lever 30 and tines 31, 32 is to permit the arrangement of the tines 31, 32 on opposite sides of the radially projecting foot lever 46, which extends from the upper slot 47 of the housing 48 of the electric controller 21 so that the same lever 46 which controls the electric controller may also actuate the cam lever 30 of the air drive controller by means of the tines 31, 32 upon opposite sides of the electric control lever 46 so that this electric lever 46 may constitute a common controlling device for both the electric driven engine and the air driven handpiece.

The bottom of the plate 22 is provided with a lower sheet metal cover plate 49 having a sponge rubber covering 50 of annular shape; and both the plate 49 and covering 50 have a laterally projecting extension 51 for covering the bottom of the cast metal plate 22 to which the plate 49 is secured by through bolts.

Referring to FIG. 4, this is a bottom view of the plate 22; and the bottom of the plate is formed with a pair of parallel and generally radially extending rectangular grooves 52, 53 for slidably receiving the rectangular push rods or plungers 39 and 54, which are provided with the rollers 38 and 55 on their inner ends for engaging the cam 35.

The push rods 39 and 54 are secured in the grooves 52 and 53 by a pair of guide plates 56, 57, which are secured to the bottom of the plate 22 by the screw bolts 58 which pass through the guide plates 56, 57 and are threaded into the bottom of cast metal plate 22, leaving sufficient clearance for sliding movement of the push rods 39 and 54.

The push rods 54 and 39 are bent upwardly at their ends opposite to the rollers 55 and 38 and provided with upwardly turned ends 59 and 60, thereby increasing the area of the end surface of each push rod, as they are adapted to engage the ends 61 and 62 of a pair of air valves, the structure of which is shown in FIG. 9; and the air valve 61 is for the purpose of controlling the flow of drive air for the air driven turbine, while the air valve 62 is for the purpose of controlling the flow of chip air for blowing out or cleaning the cavity in the course of cavity preparation.

The cast metal plate 22 is provided with openings 63, 64 surrounding the roller ends of the push rods 39 and 54; and the enlarged apertures 65 and 66 are provided for the screw bolts which pass through the cast metal plate and are threaded into the bottom of the electric controller 21.

The cast metal plate 22 is provided with a downwardly projecting rim 67, 68, which forms an annular housing 69 for receiving electric conductors and air and water control tubes which extend to the electric controller 21 and the air drive controller 23; and the rim 67, 68 has a cut-out 70 for receiving a rubber grommet 71, which is located about the tubes and conductors that are housed in a tubular plastic covering 72.

Figure 6:
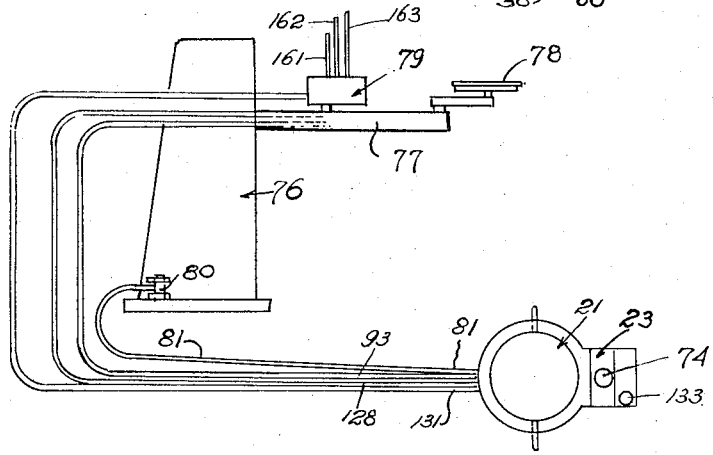
FIG. 6 is a diagrammatic illustration of an air circuit diagram for the present foot controller.

The cast metal plate 22 has an integral upwardly projecting portion 73 (FIG. 2) which forms a housing for surrounding the push rods 39 and 54 and for housing the tubes and electrical connections and an electric switch actuated by plunger head 74, which switch is of the snap type, being a two way switch, indicated in the diagram of FIG. 6a by numeral 75, and adapted to connect either the electric controller 21 or the air drive controller 23 in the energizing circuit so that the dentist may prepare cavities by using the handpiece that is driven by the electric engine or the air driven handpiece that is controlled by the air control 23.

The plunger head 74 is carried by a sliding plunger slidably mounted in a guide in the housing 73 and adapted to actuate the switch 75 which is located inside the housing. One push on the plunger head 74 closes the electric engine contacts, while a second push opens those contacts and closes the air drive contacts of the switch 75.

Referring to FIG. 6a, this in an air circuit diagram for the present foot controller, which is indicated at 23 at the lower right. The electric engine controller is indicated at 21. 76 indicates a dental stand for supporting a dental engine; and it is provided with the usual arm 77 for supporting a movable tray 78.

An air turbine control cabinet is carried by this arm, and indicated at 79. The air supply under pressure is indicated at 80 for providing air at 50 to 65 pounds per square inch. The air supply 80 is connected by a flexible air tube 81 to the air manifold of the air turbine foot controller 23.

The rubber tube 81 is connected, as shown in FIG. 9, by a threaded fitting 82 to a conduit 83 in the casting 84, which is secured to the housing 73 by a plurality of screw bolts, indicated at 85, 86, 87, threaded into the housing member 73.

The air supply conduit 83 communicates with a cored conduit 88 (FIG. 9) which extends to the bore 89 and by means of another cored conduit 90 it extends to the bore 91. Bore 89 is part of an opening which houses the chip air valve 62 and bore 91 houses the drive air valve 61, so that both these valves are supplied with air under pressure at their rear ends or upper ends in FIG. 9.

Both valves are actuated to outer position by the air pressure in the bores 89 and 91 and have no spring, as the use of a spring would produce a stiffer operation of the plungers.

The chip air outlet from the casting 84 is indicated at 92, and is connected by a threaded fitting to a chip air tube 93. The outlet 92 communicates by means of a cored conduit 94 to the counterbore 95, which communicates with the bore 89.

A chip air valve assembly is carried by a threaded plug 96, which is threaded into a counterbore 97 communicating with the bore 95. Threaded plug 96 has an annular shoulder 98 engaging a gasket 99 to provide a leakproof closure for the threaded bore 97.

The threaded plug 96 has a cylindrical bore 100 for receiving the cylindrical plunger 101, which forms the operating part of the chip air valve 62. Threaded plug 96 carries an axial extension 102 which is reduced in size, forming an annular groove 103 in the bore 95.

The reduced extension 102 has a plurality of apertures 104 providing communication between the groove 103 and the internal bore 100 in the plug 96. Plug 96 also supports a further cylindrical extension 105, which is provided with a rubber O-ring 106 closing off the bore 95 at this end of the plug 96.

The end of the plug 96 is indicated at 107, forming a valve surface for engaging an O-ring 108 on the plunger 101 and shutting off the air when the plunger 101 moves to its lower position in FIG. 9.

Plunger 101 has a flat portion 109 which permits the flow of air along the plunger 101 when the chip air valve is open, as shown in FIG. 9. The air from the flattened portion 109 of the plunger 101 may then pass out of the apertures 104 to the groove 103 and conduit 94 to the clip air tube 93.

As soon as the air pressure is applied to the air inlet tube 81 the chip air valve 62 moves down to its lower position (FIG. 9), closing off the chip air at the O-ring 108 engaging end 107 of the valve plug 96.

Plunger 101 has a second O-ring 110 beyond the end of the flat side 109 for closing off the bore 100 at its front end.

The drive air valve 61 is carried by a threaded plug 111 (FIG. 9) which is threaded into bore 112 against gasket 113. Bore 112 communicates with counterbore 114 which is adapted to receive a reduced cylindrical extension 115 on plug 111 and a cylindrical extension 116 which carries an O-ring 117.

O-ring 117 closes the upper end of bore 114 against leakage; and the gasket 113 closes the lower end of bore 114.

The valve plug 111 has a cylindrical bore 118 for receiving a cylindrical plunger 119, which forms the working part of drive air valve 61. Threaded plug 111 has a groove containing O-ring 120 engaging the cylindrical plunger 119 at the outer end of bore 118.

Plunger 119 also carries an O-ring 121 in an annular groove inside the bore 118, closing off the bore 118 against leakage from its lower end in FIG. 9. Plunger 119 has an annular valve seat flange 122 at its upper end (FIG. 9) and an O-ring 123 in a groove against the flange 122, forming a valve for seating against a conical valve seat 124 at the upper end of bore 118.

When the plunger 119 is at its lowermost position (FIG. 9), O-ring 123 closes off the bore 118 at its upper end, preventing the flow of air from the air manifold 91.

The plunger 119 also has a tapered groove formed by a flat portion 124 which provides a gradual opening of the air drive valve 61 whenever the O-ring 123 is off its seat, thereby regulating the speed of drive of the air turbine.

When the air drive valve 61 is open, as shown in FIG. 9, air flows from the air manifold 91 along the tapered flat 124 of plunger 119 to the apertures 125 in the reduced portion 115 to the space surrounding reduced portion 115, which communicates with a lateral cored conduit 126 extending to the air drive outlet 127 leading to a flexible tube 128.

The casting 84 may be provided with another outlet bore 129 which communicates with the cored conduit 126 and also receives drive air from the air manifold 91 when the drive air valve 61 is open. Bore 129 has an outlet fitting 130 connecting a flexible tube 131, which carries drive air to a water controlling valve, further to be described.

The conduit 129 communicates with a vertical bore 132, which is provided with a latching air valve assembly 133 for cutting off the supply of air to the outlet 129 and tube 131 when the operator desires to grind the cavity without the use of water.

Ordinarily, when the drive air is turned on, the water spray is also turned on; but for finishing operations the dentist may desire to shut off water; and this can be accomplished by means of the latching air valve assembly 133. This assembly includes a metal bushing 134 having a threaded portion 135 and an upwardly extending tubular sleeve 136 which is provided with an internal cylindrical bore 137.

The sleeve 136 has a latching shoulder 138 with a beveled upper side 139; and the upper end of the sleeve 136 is beveled at 140 and provided with a rectangular transverse groove 141 for clearing a pin 142. The pin 142 extends through the plunger 143 and through a cap 144, which is pivotally mounted on the plunger 143 by means of the pin 142.

The upper end of the plunger is spherical at 143; and the cap 144 comprises a cylindrical cap formed with an enlarged opening 145 of cylindrical shape and with a ball socket 146 engaging the round top 143 of the plunger.

The cylindrical cap has a downwardly extending lip 147 at one side, which has a latching shoulder 148 facing upwardly and flush with the lower end 149 of the cap. The cap 144 may rock on the plunger 143; and when pressed downwardly, its latching shoulder 148 will slide over the beveled surface 139 on the sleeve 136 and catch on the latching shoulder 138, holding the plunger downward.

In this it is assisted by the action of a spring 151, which has its uppermost turns frictionally engaged on the reduced end 152 of the plunger 143. Spring 151 is located in bore 132; and there is an O-ring 153 on the plunger 143 which engages in the bore 132. The plunger is enlarged above the bore 132 and provided with a pair of spaced O-rings 154, 155 made of rubber and located in grooves in the plunger.

There is a groove in the plunger, indicated at 156, and provided with a bleeder hole 157, which communicates with a bore 158 inside the plunger to relieve pressure below the plunger when the air has been turned off. There is also a bleeder opening in the casting 84, indicated at 159, for relieving pressure inside the bore 132 when the air is turned off.

The purpose of the valve assembly 133 is to permit the dentist to shut off the water spray at will by stepping on the cap 144 and moving it down to cut off the air to the tube 131.

When the air is cut off at the tube 131 leading to an air actuated water control valve, the water spray is shut off at the handpiece; and the cap 144 is latched in its lowermost position as long as the dentist wants the water spray shut off.

When he steps on the cap 144 at its corner opposite to the latch, the cap pivots and is released from the shoulder 138 and moved upward with the plunger opening the valve assembly in the bore 137 and permitting the air again to flow to the air actuated water valve which provides the spray water.

Referring again to FIG. 6, the air under pressure is delivered by tube 81 to the air controller 23; and three other tubes 93, 128, and 131 extend from the foot controller 23 to the control unit 79. Other tubes 161, 162, and 163 extend from the control unit to the handpiece providing it with drive air, chip air, and water for water spray.

The control unit may be of the type shown in my prior application Ser. No. 798,866 on "Control Units for Air Driven Dental Handpieces," filed March 12, 1959, now abandoned, the disclosure of which is hereby incorporated by reference thereto.

This control unit is adapted to provide spray water which is filtered and regulated in pressure and throttled by a needle valve as to volume and adapted to be turned on or off by a solenoid valve.

The control unit also provides drive air which is reduced and regulated in pressure, filtered, dried, and provided with entrained lubricant mist and controlled by solenoid valves and regulated as to volume by needle valves.

Referring to FIG. 6a, this is a wiring diagram of one form of installation. In this diagram the electric controller is indicated at 21 and the foot controller is that shown at 23 in FIG. 1.

The circuit includes solenoids for actuating valves, indicated at 170 the solenoid for water, 171 the solenoid for cleaning air, and 172 the solenoid for drive air, all of which are in the air turbine control unit 79.

The drive air solenoid 172 is controlled by the relay actuating switch 173 which is shown in closed position and is controlled by a relay coil 174. When the relay coil 174 is energized, the movable contact 175 breaks contact with the fixed contact 176, breaking the drive air solenoid circuit and closing against the fixed contact 177.

The movable contact 178 actuated by the same relay coil 174 engages the fixed contact 179, closing the circuit for operation of the electric engine.

75 indicates the two-way switch which is controlled by the plunger 74 previously mentioned; and the switch is of the type that one push closes the circuit and energizes the relay 174 to place the circuit in condition for operating the electric engine and the second push on the plunger 74 opens the circuit at 75, de-energizing the relay 174 and permitting the air turbine circuits to be closed, as shown in FIG. 6a, for operation of the air turbine.

Thus the present controller is always arranged for operation of the electric engine or the air driven turbine.

It will thus be observed that the present controller assembly is controlled by the operation of a single foot lever which moves responsive to the lever 46 and by virtue of the upwardly projecting tines 31, 32, the lever 30, which controls the operation of the air turbine is also operated.

The number of controlling devices which the dentist is required to find and operate is reduced and the drive and speed of both the air driven and the electric motor driven dental handpieces may be varied and controlled by a single lever, which also controls the use of the chip cleaning air.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A foot actuated controller assembly for dental handpieces comprising a base secured to the bottom of a rheostat dental engine controller, said rheostat having a radially projecting foot lever, a second lever pivotally mounted on said base and projecting radially from the assembly below the foot lever, upwardly extending lugs on said second lever located outside the engine controller and engaging the foot lever on its opposite sides so that the second lever moves with the foot lever of the controller, and an air controlling valve carried by said plate and actuated by said second lever to regulate the flow of turbine-driving air discharged from said assembly.

2. A foot actuated controller assembly according to claim 1, in which the second lever carries a cam near its inner end, the cam acting on said air valve to adjust the speed characteristics of the valve and turbine to the movement of the foot lever.

3. A foot actuated controller assembly according to claim 2, in which the base is formed with guides slidably supporting a push rod engaging the cam at one end and engaging a valve plunger for said air controlling valve at the other end.

4. A foot actuated controller assembly according to claim 2, said base supporting a second air valve controlling the flow of chip cleaning air for delivery to a handpiece nozzle, the cam turning both valves off in a central position and turning on either drive air or chip air in two other positions.

5. A foot actuated controller assembly according to claim 4, said base slidably supporting a pair of push rods on opposite sides of the pivot line of the second lever, both rods engaging said cam on opposite sides of said pivot line, and each push rod extending to a valve plunger to control the opening and closing of both valves depending on the direction of rotation of said second lever.

6. An attachment for an electric dental engine controller comprising a metal plate of circular form having a radial valve supporting arm and being adapted to support an electric dental engine controller, a valve housing mounted on said arm, a pair of parallel guide grooves provided by said plate, a pair of air valve members in said housing and having a pair of valves actuated by plungers, a push rod in each of said guide grooves and extending from each plunger, a valve lever pivotally mounted on said plate and having a cam engaging both said push rods, movement of said lever in one direction turning on one of said valves for drive air, and movement in the other direction turning on the other valve for chip air.

7. An attachment according to claim 6, in which an electric dental engine controller is mounted upon said plate, said valve lever having a pair of upwardly extending lugs located to engage the opposite sides of a foot lever provided by said electric controller, to interconnect the valve lever and the foot lever of the electric controller for simultaneous movement.

References Cited by the Examiner

UNITED STATES PATENTS

| | | | |
|---|---|---|---|
| 2,542,833 | 2/1951 | Page | 32—28 |
| 3,094,780 | 6/1963 | Maurer et al. | 32—28 |
| 3,209,457 | 10/1965 | Billin et al. | 32—22 |

RICHARD A. GAUDET, *Primary Examiner.*

ROBERT E. MORGAN, *Examiner.*